(12) United States Patent
Wahrburg et al.

(10) Patent No.: US 10,969,756 B2
(45) Date of Patent: Apr. 6, 2021

(54) ROBUST AUTOMATIC METHOD TO IDENTIFY PHYSICAL PARAMETERS OF A MECHANICAL LOAD WITH INTEGRATED RELIABILITY INDICATION

(71) Applicant: ABB SCHWEIZ AG, Baden (CH)

(72) Inventors: Arne Wahrburg, Darmstadt (DE); Silke Klose, Bensheim (DE); Edo Jelavic, Zurich (CH)

(73) Assignee: ABB SCHWEIZ AG, Baden (CH)

(*) Notice: Subject to any disclaimer, the term of this patent is extended or adjusted under 35 U.S.C. 154(b) by 67 days.

(21) Appl. No.: 16/214,162

(22) Filed: Dec. 10, 2018

(65) Prior Publication Data

US 2019/0113895 A1 Apr. 18, 2019

Related U.S. Application Data

(63) Continuation of application No. PCT/EP2017/063987, filed on Jun. 8, 2017.

(30) Foreign Application Priority Data

Jun. 10, 2016 (EP) ..................................... 16001317

(51) Int. Cl.
| | |
|---|---|
| *G05B 17/02* | (2006.01) |
| *G05B 13/04* | (2006.01) |
| *G06F 17/14* | (2006.01) |
| *G05B 13/02* | (2006.01) |
| *G05B 19/31* | (2006.01) |

(52) U.S. Cl.
CPC ........... *G05B 17/02* (2013.01); *G05B 13/044* (2013.01); *G06F 17/142* (2013.01)

(58) Field of Classification Search
CPC .... G05B 13/02; G05B 13/021; G05B 13/024; G05B 13/0265; G05B 19/31; G05B 17/02; G05B 13/044; G05B 17/142
USPC ......................................................... 700/275
See application file for complete search history.

(56) References Cited

U.S. PATENT DOCUMENTS

| | | | | |
|---|---|---|---|---|
| 4,495,560 A | * | 1/1985 | Sugimoto | .......... B60H 1/00814 700/34 |
| 8,390,234 B2 | | 3/2013 | Villwock | |
| 2009/0138102 A1 | | 5/2009 | Moden | |

(Continued)

FOREIGN PATENT DOCUMENTS

| | | |
|---|---|---|
| CN | 102393640 A | 3/2012 |
| WO | WO 2017211965 A1 | 12/2017 |

OTHER PUBLICATIONS

Sebastian Villwock et al: "Application of the Welch-Method for the Identification of Two and Three-Mass-Systems", IEEE Transactions on Industrial Electronics, vol. 54, No. 1, Jan. 1, 2208 (Jan. 1, 2008), pp. 457-466, XP011198792.

(Continued)

*Primary Examiner* — Michael J Brown
(74) *Attorney, Agent, or Firm* — Leydig, Voit & Mayer, Ltd.

(57) ABSTRACT

A method to identify physical parameters of a mechanical load with integrated reliability indication includes: applying a first control signal to a mechanical device in a control circuit; measuring a first return signal; and using a power density spectrum of the first return signal to stipulate an excitation signal for the mechanical device.

15 Claims, 10 Drawing Sheets

(56) References Cited

U.S. PATENT DOCUMENTS

2011/0022193 A1* 1/2011 Panaitescu ............. A41D 20/00
                                                        700/29
2013/0344830 A1* 12/2013 Coe ..................... H04W 52/367
                                                       455/127.1

OTHER PUBLICATIONS

Saarakkala Seppo E Etal: "Identification of two-mass mechanical systems in closed-loop speed control", IECON 2013—39$^{th}$ Annual Conference of the IEEE Industrial Electronics Society, Nov. 10, 2013 (Nov. 10, 2013), pp. 2905-2910, XP032538690.

Zoubek H et al: "A method for speed-sensorless identification of two-mass-systems", Energy Conversion Congress and Exposition (ECCE)m 2010 IEEE, IEEE, Sep. 12, 2010 (Sep. 12, 2010), pp. 4461-4468, XP031787629.

Villwock S et al: "Influence of the power density spectrum of the excitation signal on the identification of drives", Industrial Electronics, 2008, IECON 2008, 34$^{th}$ Annual Conference of IEEE, IEEE, Nov. 10, 2008 (Nov. 10, 2008), pp. 1252-1257, XP031825599.

\* cited by examiner

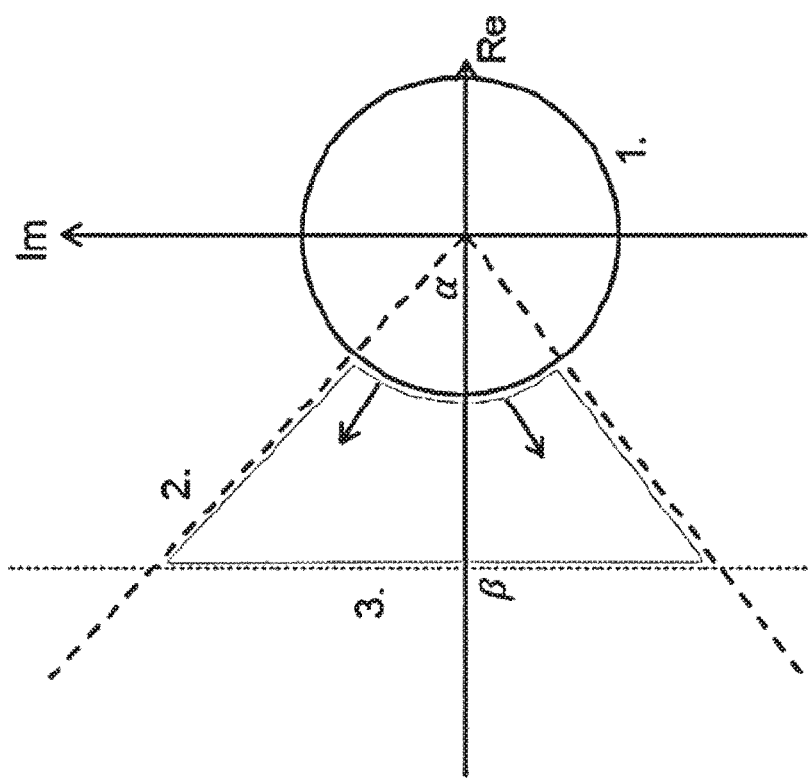

ROBUST AUTOMATIC METHOD TO IDENTIFY PHYSICAL PARAMETERS OF A MECHANICAL LOAD WITH INTEGRATED RELIABILITY INDICATION

CROSS-REFERENCE TO PRIOR APPLICATION

This application is a continuation of International Patent Application No. PCT/EP2017/063987, filed on Jun. 8, 2017, which claims priority to European Patent Application No. EP 16001317.3, filed on Jun. 10, 2016. The entire disclosure of both applications is hereby incorporated by reference herein.

FIELD

The present invention relates to a method to identify physical parameters of a mechanical load with integrated reliability indication.

BACKGROUND

In order to achieve high performance in speed- or position-controlled applications, the feedback and feedforward components in the control loop have to be carefully tuned, as well as additional filters.

Most tuning methods resulting in such a set of parameters rely on a parametric model of the mechanical load to be available. An example are two-mass systems with compliant coupling as depicted in FIG. 1b.

Such systems are described by a set of physical parameters, such as torsional stiffness and damping, inertia ratio, etc. In many applications, these parameters are not known but have to be identified from measurements of motor torque (the system input) and motor speed (the system output). This invention disclosure proposes a new approach to obtain estimates of the relevant mechanical parameters.

SUMMARY

In an embodiment, the present invention provides a method to identify physical parameters of a mechanical load with integrated reliability indication, comprising: applying a first control signal to a mechanical device in a control circuit; measuring a first return signal; and using a power density spectrum of the first return signal to stipulate an excitation signal for the mechanical device.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 4 shows constraints for closed-loop eigenvalues in optimization-based controller and filter tuning.

DETAILED DESCRIPTION

The object of the invention is to determine the physical parameters of a mechanical load coupled to a motor in an automated method and therefore to quantify to the best extent possible the reliability of the parameter approximation.

Purpose: A widely used approach is to perform identification measurements and evaluate them by calculation of the frequency response of the mechanical load attached to the Drive/Motor unit.

Evaluating identification measurements using e.g. Fast Fourier-Transforms (FFTs) results in a non-parametric frequency response estimates. For each frequency, an estimate of magnitude and phase of the system transfer function is obtained.

However, in order to design controllers for the system at hand, a parametric estimate is required for most tuning methods. A parametric model for the mechanics sketched in FIG. 1b is given by the mechanical transfer function $$G_{TMS}(s) = \frac{s^2 J_L + s(d_T + d_L) + k_T}{s^3 J_M J_L + s^2(J_L d_M + d_T(J_M + J_L) + J_M d_L) + s(d_{tot} d_T + k_T(J_M + J_L) + d_M d_L) + k_T d_{tot}}.$$

To completely describe the model and its characteristics, the corresponding mechanical parameters (motor inertia $J_M$, load inertia $J_L$, motor-side damping $d_M$, load-side damping $d_L$, torsional stiffness $k_T$, torsional damping $d_T$) have to be found. In other words, the physical parameters of the mechanical load (e.g. stiffness and damping coefficients) have to be identified from the non-parametric estimate.

Figure 2:
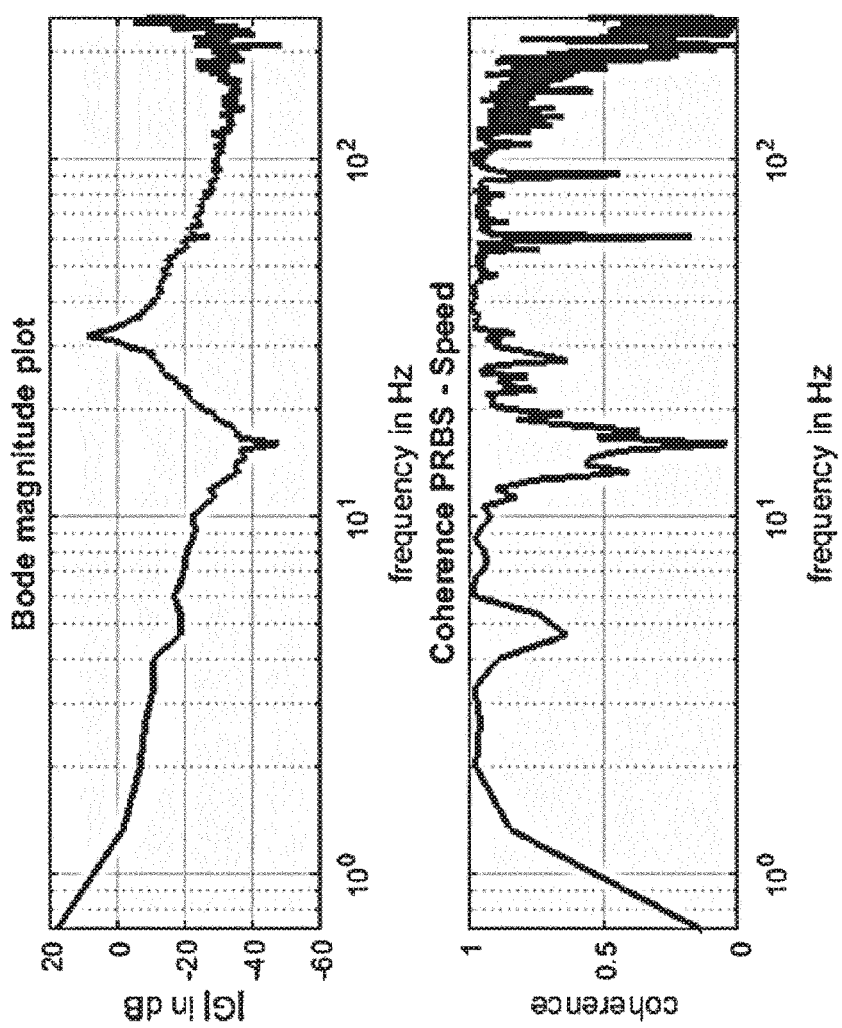
FIG. 2 shows non-parametric frequency response estimate and corresponding coherence estimate.
Figure 2B:
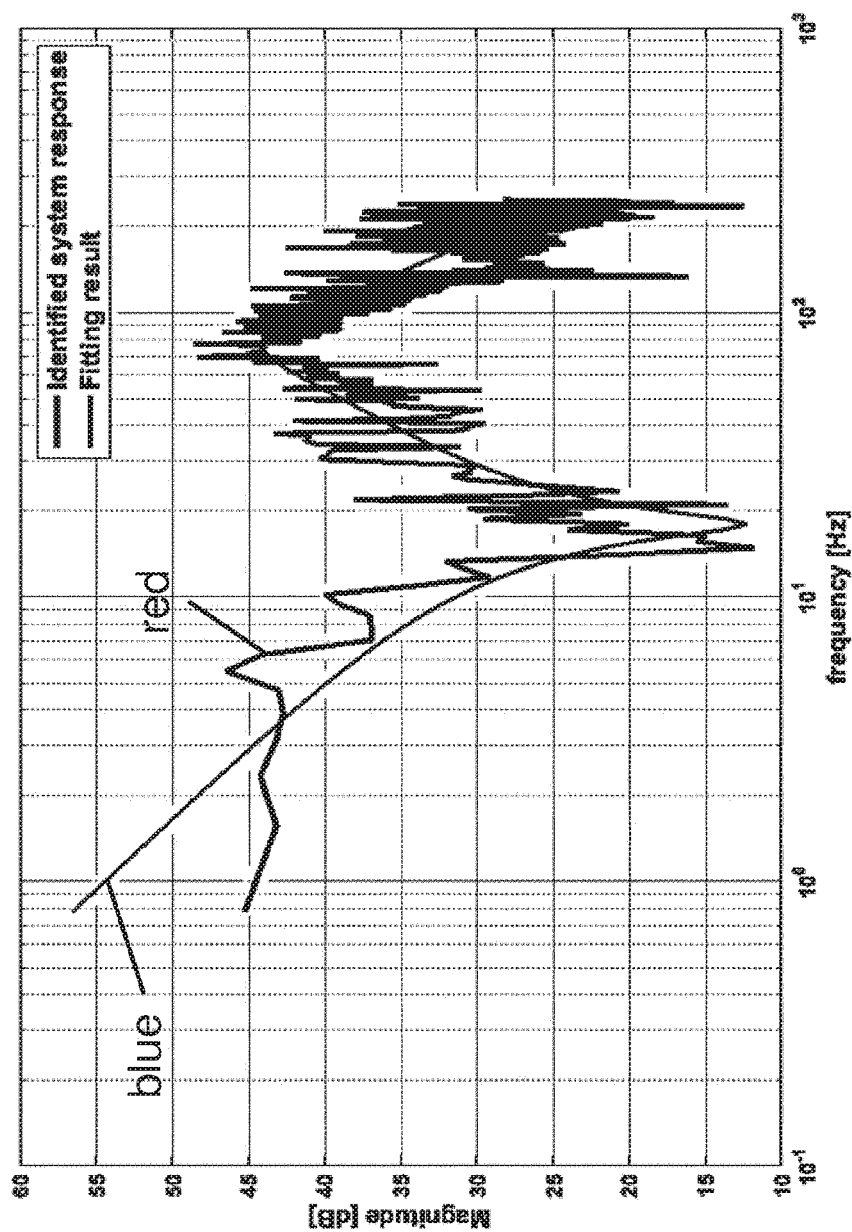
FIG. 2b shows non-parametric frequency response estimate (red curve) and fitted parametric model (blue curve, fitted curve)

FIG. 2b shows an example of a non-parametric estimate in red and a corresponding parametric estimate in blue (fitted line).

The blue curve (fitted curve) is obtained by performing a curve fit onto the red curve, where the structure of the mechanical plant is assumed to be known (cf the transfer function $G_{TMS}(s)$ above). From a practical perspective, this assumption is valid since a wide class of mechanical system can reasonably well be approximated by two-mass systems.

Automatically fitting a parametric model onto the non-parametric frequency response is challenging for several reasons:

The plant may contain dynamics (e.g. higher modes) that are not taken into account by the two-mass model assumption. Such unmodeled effects in the frequency response corrupt the curve fitting.

Since the speed and torque measurements recorded in order to obtain the non-parametric estimate are subject to noise, the calculated frequency response is also subject to noise. This is especially true for very low and high frequencies, for the plant is not well excited during the identification experiments.

Furthermore, limited measurement time and sampling rate deteriorate the quality of the non-parametric estimate.

The curve fitting problem is non-convex. Hence, proper initial values have to be found in order to avoid local minima and poor identification results.

In this invention disclosure, a new method is proposed to overcome the aforementioned difficulties.

All steps are fully automated and do not require user input.

An alternative to the fully automatic solution proposed here is described in the related ID "A semi-automatic, interactive tool to identify physical parameters of a mechanical load", where human pattern recognition abilities are employed to obtain a parametric plant model in a guided, semi-automatic fashion. Said invention has been filed by European patent application 16001318.1.

This invention disclosure aims at solving the task of parameter identification for a two-mass system by performing an automatic curve fit of a Bode plot of a parametric physical model to the calculated non-parametric Bode plot.

While this concept is well-known (s. references [Ib], [IIb], [IIIb]), the innovation improves it with two main new features.

Firstly, the new curve fitting takes into account the fact that the variance and accuracy of the calculated non-parametric Bode plot are not the same for each frequency. Especially for anti-resonances and high frequencies, the calculated Bode plot is known to be subject to a lot of variance due to the small signal-to-noise ratio.

Intuitively, the calculated non-parametric Bode plot should not be "trusted" too much for these frequencies during the curve fitting process. This is accounted for in the new curve fitting that also takes into account the frequency range the plant is sufficiently excited in.

This is possible because the excitation signal is automatically parameterized in a prior step and hence its properties are known. As a result, the new identification procedure delivers substantially improved robustness.

Secondly, the method does not only provide estimates of the physical plant parameters but also a quality indication. Based on various criteria, it is automatically assessed how well the estimated plant parameters can explain the underlying non-parametric frequency response. The information provided by this feature can be used to automatically adjust controller aggressiveness in a consecutive controller tuning step.

But first and foremost, the quality indication for the identification can be used as a safeguard to prevent auto-tuning control parameters if the identification quality is poor. In such a case, the auto-tuning process will be stopped and the user could be asked to re-do the experiments.

For several aspects, the method allows providing suggestions to the user as to how improve identification quality (e.g. increasing excitation amplitude, reducing excited frequency range, decreasing controller aggressiveness during identification).

Benefits: Since chances of integration into future software products as an advertised feature are realistic, the benefit arises from adding a new feature to existing Drives software. The advantages are:

Catching up with other solutions in terms of automatic plant identification for speed/position controller tuning.

Potential benefits arising from a unique feature (automatic reliability indication) in Drives software.

Measurement data and information on intermediate steps is stored and can be evaluated in several ways, including remote service for customers, analysis of types of loads connected to sold Drives, etc.

Mechanical load identification can be conducted by in a fully automatic manner, less expertise required to conduct commissioning.

Increased control performance based on improved model identification and reliability indication.

A pseudo-random binary signal could be used as excitation signal.

Thus, advantageously, only two values are used for the excitation signal. The amplitude of the excitation is limited hereby.

A second control signal comprising the first control signal and the excitation signal could be applied to the control circuit and the power density spectra of the second control signal and the second return signal are calculated, wherein the frequency response of the mechanical device is calculated from the power density spectra.

Thus, the frequency response of the mechanical device can be estimated when as yet, none of the parameters of the mechanical device are reliably known.

A reference model could be used for the mechanical device, preferably a two-mass oscillator, wherein this reference model can be described by physical parameters, wherein the parameters are selected in such a manner that the weighted summed deviation between a frequency response of the reference model and the calculated frequency response is minimized.

Thus, physical parameters can be determined which describe the reference model. The parameters are determined for a length of time until a frequency response based on the reference model has the best possible fit with the calculated frequency response.

The weighting could be carried out using a coherence function.

Thus, a measurement of the reliability of the approximation of the frequency response can be provided.

The coherence function, preferably its mean value in the frequency range considered, could be used in order to quantify the approximation to the calculated frequency response by the reference model.

Thus, it is possible to assess how well a frequency response based on the reference model fits with that which has been approximated. It is possible to quantify how well a determined mechanical reference model describes the actual mechanical device.

Figure 1:
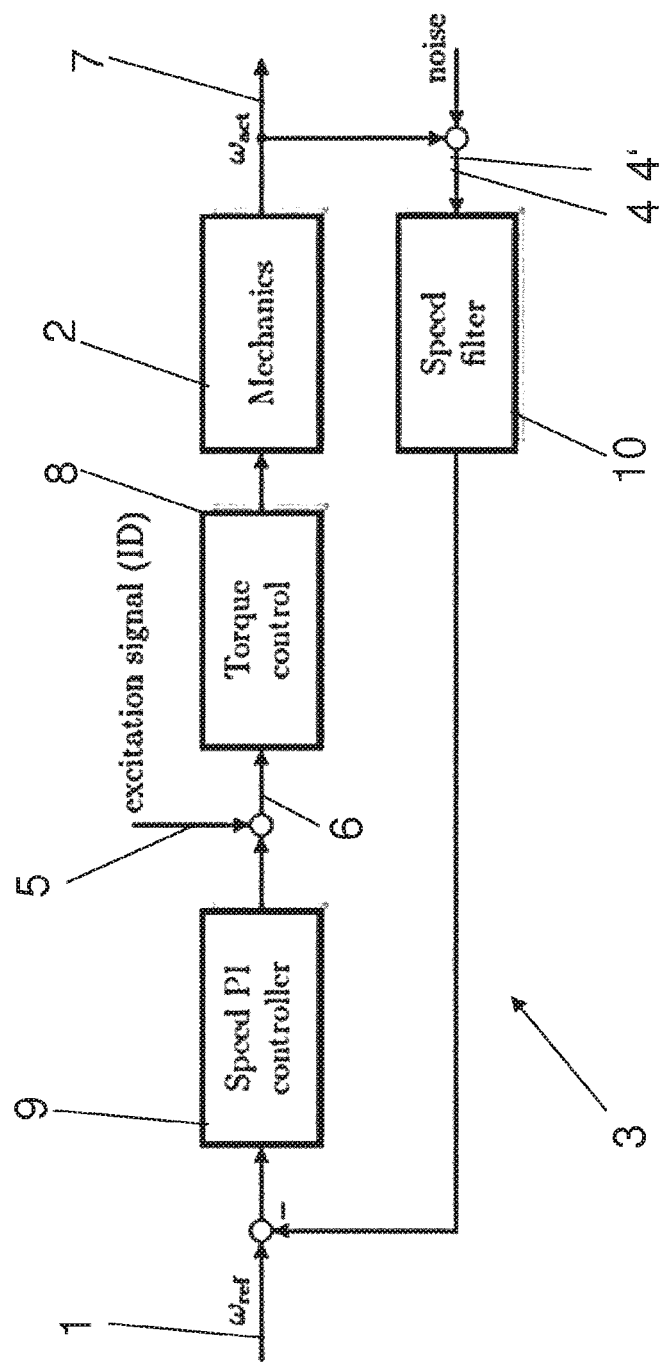
FIG. 1 shows speed control loop of variable speed drives.
Figure 1B:
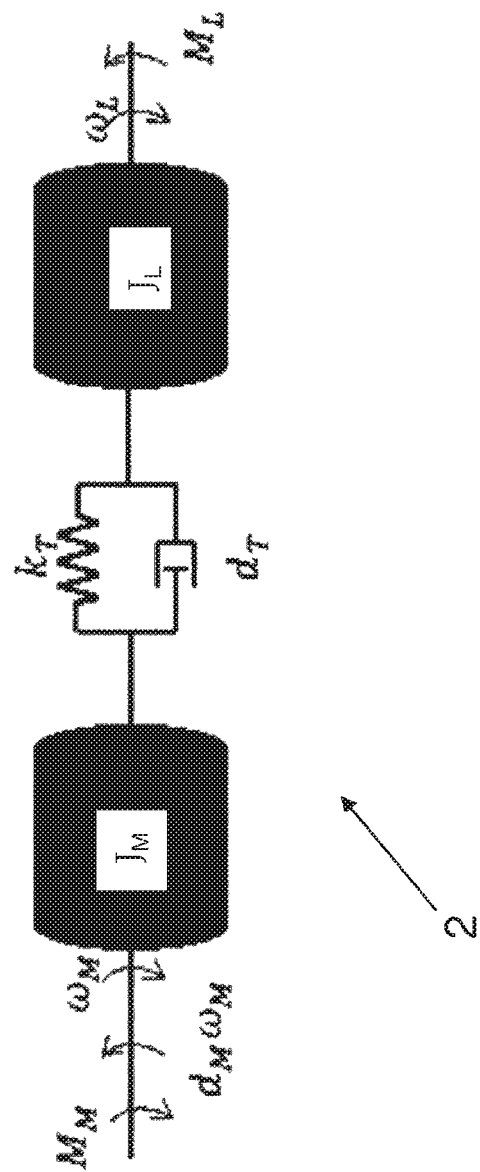
FIG. 1b shows a mechanical two-mass system.

FIG. 1 is a diagrammatic representation of the following method:

Method in which a first control signal 1 is applied to a mechanical device 2 in a control circuit 3, wherein a first return signal 4 is measured.

The power density spectrum of the first return signal 4 is used to stipulate an excitation signal 5, preferably a broadband excitation signal, for the mechanical device 2. A pseudo-random binary signal is used as excitation signal 5.

A second control signal 6 comprising the first control signal 1 and the excitation signal 5 is applied to the control circuit 3 and the power density spectra of the second control signal 6 and the second return signal 4' are calculated, wherein the frequency response of the mechanical device 2 is calculated from the power density spectra.

A reference model is used for the mechanical device 2, preferably a two-mass oscillator, wherein this reference model can be described by physical parameters, wherein the parameters are selected in such a manner that the weighted summed deviation between a frequency response of the reference model and the calculated frequency response is minimized. The weighting is carried out using a coherence function.

The coherence function, preferably its mean value in the frequency range considered, is used in order to quantify the approximation to the calculated frequency response by the reference model.

By means of the invention described herein, the physical parameters of a reference model of a mechanical device 2 can be determined.

The control circuit 3 shown diagrammatically in FIG. 1 comprises a speed controller 9, a subordinate torque control 8 and a velocity filter 10.

Initially, the speed controller 9 passes the first control signal 1 directly to the torque control 8. The torque control 8 then actuates the mechanical device 2. The mechanical device 2 produces an actual angular velocity 7 ($\omega_{act}$).

The mechanical device 2 is preferably configured as a motor with a shaft to which a load is coupled.

The actual angular velocity 7 corresponds to a measured value, namely the first return signal 4. The magnitude of the noise component in the first return signal 4 is checked. The magnitude of the noise component is used to calculate the excitation signal 5.

Because both the second control signal 6 and the second return signal 4' are known, the physical parameters of the reference model for the mechanical device 2 can be determined.

The following should be noted having regard to FIG. 1b:

MM describes the torque which constrains the torque control 8. The angular velocity $\omega_{act}$ corresponds to $\omega_M$. The quantity $d_M \omega_M$ represents a damping. $J_M$ represents the inertia of the motor. The quantity $k_T$ represents the stiffness of the shaft, $d_T$ represents the damping of the shaft. $J_L$ represents the inertia of the load. The rotational speed of the load is expressed as $\omega_L$. $M_L$ corresponds to a load torque. The parameters $k_T$, $d_T$, $J_1$, $J_M$, $d_M$ and $d_L$ (damping of the load) can be discerned from the red curve in FIG. 3, the blue curve in FIG. 2b and the red curve in FIG. 4b, or determine the profile of the curve.

Figure 3:
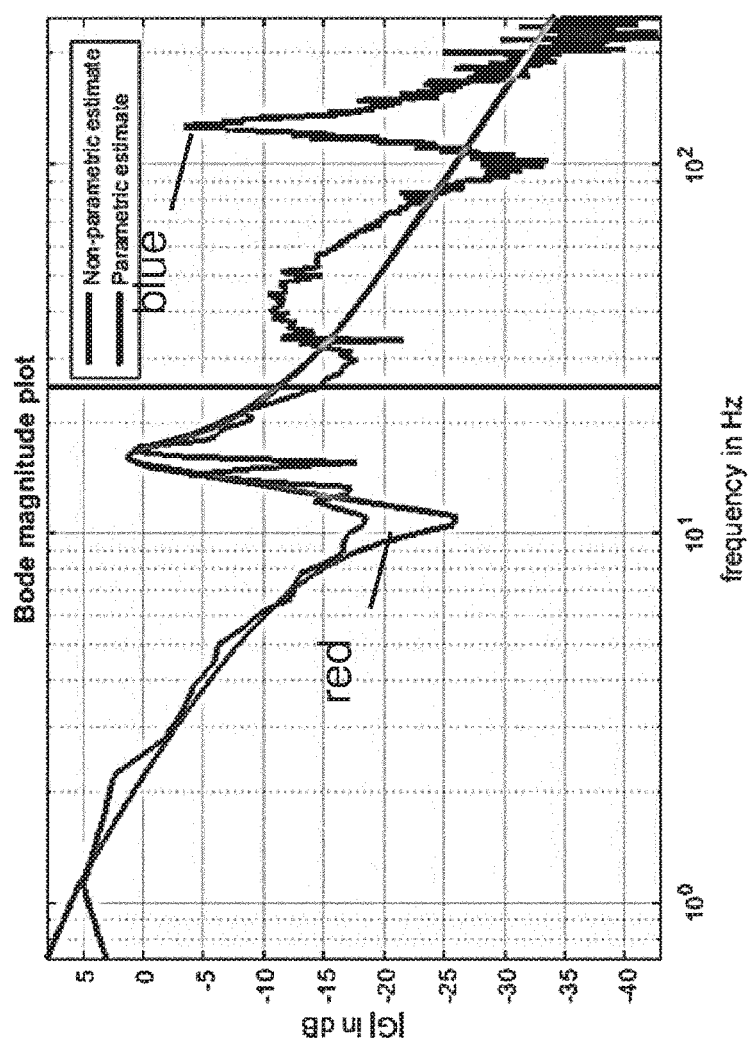
FIG. 3 shows approximation of non-parametric frequency response estimate by a two-mass model. Curve fitting is constrained by the right of the black line.
Figure 3B:
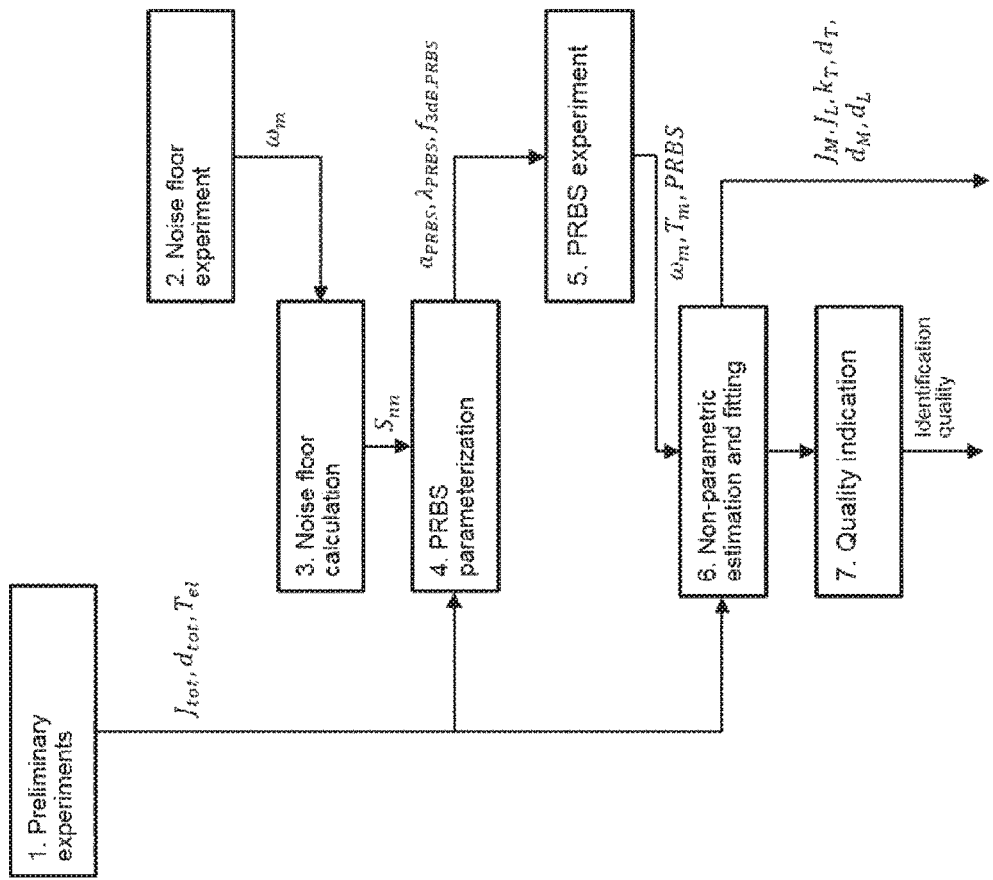
FIG. 3b shows a flowchart of automatic plant identification and quality indication.

The general flowchart of the proposed method is sketched in FIG. 3b.

In the first step, basic quantities such as total system inertia $J_{tot}$, total viscous damping $d_{tot}$ and electrical time constant $T_{el}$ are determined using existing methods.

In the second step, the motor is run at a constant speed for a short duration of about two seconds. To maintain constant speed, the drive is operated in speed control mode with default parameters (i.e. very defensive). During the experiment, the unfiltered speed signal $\omega_m$ (either measured from by an encoder or estimated by the drive) is recorded.

In the third step, the Power Spectral Density (PSD) of the zero-mean speed signal is estimated (e.g. using Welch's method) and its median $S_{nn}$ is calculated, which is termed the "noise floor".

In the fourth step, the excitation signal for the actual identification experiment is automatically parameterized based on the identified noise floor and total inertia. The excitation signal is a Pseudo-Random Binary Signal (PRBS), which is characterized by its cycle time $\lambda_{PRBS}$ and amplitude $\alpha_{PRBS}$. Apart from those two parameters, the frequency $f_{3dB,PRBS}$ up to which the PRBS will sufficiently excite the plant is available as an output of the fourth block.

In the fifth step, the actual identification experiment takes place. Therein, the motor is again run at constant speed in speed control mode with a defensive controller parameterization (e.g. default parameters). The PRBS signal is injected into the plant as an additional torque and unfiltered motor speed $\omega_m$, unfiltered motor torque $T_m$, and the PRBS signal itself are recorded. The measurement duration is approx. 5 s.

In the sixth step, a non-parametric plant estimate is calculated from the estimated PSDs of motor torque and speed.

Furthermore, coherence functions of the three recorded signals are calculated. Being functions of frequency, they indicate how well an output signal can be explained by an input signal and a linear system connecting the two.

Before the actual curve fitting takes place, initial parameters are calculated. This is based on a robust peak detection for finding the first resonance peak. Based on the identified initial parameters, the non-convex curve fitting problem is solved.

To this end, different cost functions can be evaluated, e.g. the sum of squared errors between the fitted parametric and the non-parametric estimate for each frequency, weighted with the respective coherence value between motor torque and motor speed.

The optimization can be solved by different techniques, e.g. with a Nelder-Mead-Algorithm [IVb]. It is important to notice that the frequency range for fitting as well as the coherence function is taking into account in the fitting process.

Figure 4B:
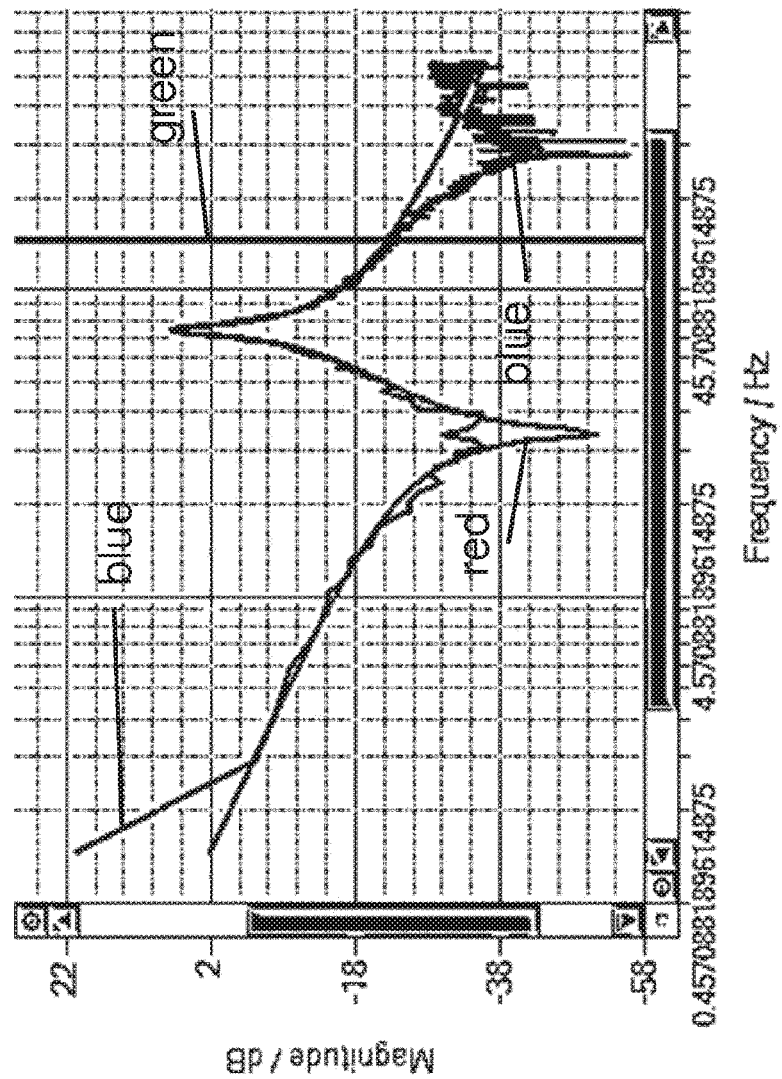
FIG. 4b shows a fitted parametric estimate (red curve) and original non-parametric estimate (blue curve). Except for the anti-resonance region, the fitting result is very accurate (only frequencies up to the upper bound marked in green (plumb line) are taken into account)

This provides a significant robustness advantage. As an outcome of the sixth step, estimated physical plant parameters (motor inertia $J_M$, load inertia $J_L$, torsional stiffness $k_T$, torsional damping $d_T$, motor-side damping $d_M$, and load-side damping $d_L$) are available (s. FIG. 4b).

The seventh step is devoted to quality indication. Different criteria are evaluated, namely Controller aggressiveness: Evaluated from coherence of the injected PRBS signal and torque reference. The ideal situation for system identification would be an open loop system where the torque reference is equal to the PRBS signal, resulting in a coherence value of 1 for all frequencies. However, all identification experiments are assumed to be run in closed-loop control.

Thereby, the feedback controller partially attenuates the injected PRBS signal. The more aggressive the controller is, the more the coherence values degrade, especially for lower frequencies. Thus, the evaluation of coherence between PRBS and torque reference allows to judge if the applied controller is suitable for the identification experiment.

System linearity: Since the identification experiment is run at constant speed, the only varying input to the system is the PRBS signal, where the measured output is the motor speed signal. Evaluating the coherence function between those two signals allows to judge overall system linearity and/or the presence of other unmodeled inputs to the system.

Fitting reliability: The non-parametric estimate of the Bode plot is obtained from measured torque reference and motor speed. Thus, the coherence between those two signals can be employed to judge how reliable the non-parametric estimate is.

Fitting error: The fourth criterion is the value of the overall curve fitting error between the non-parametric and parametric estimate. The number depends on the cost function chosen for curve fitting (e.g. sum of squared errors weighted with coherence between torque reference and motor speed) and is normalized to the number of data points.

For each criterion, a quality indicator is given. Based on those indicators, a traffic light indicator shows if the overall identification quality is good (green, right side of the spectre), medium (yellow, middle of the spectre) or poor (red, left side of the spectre).

Figure 5:
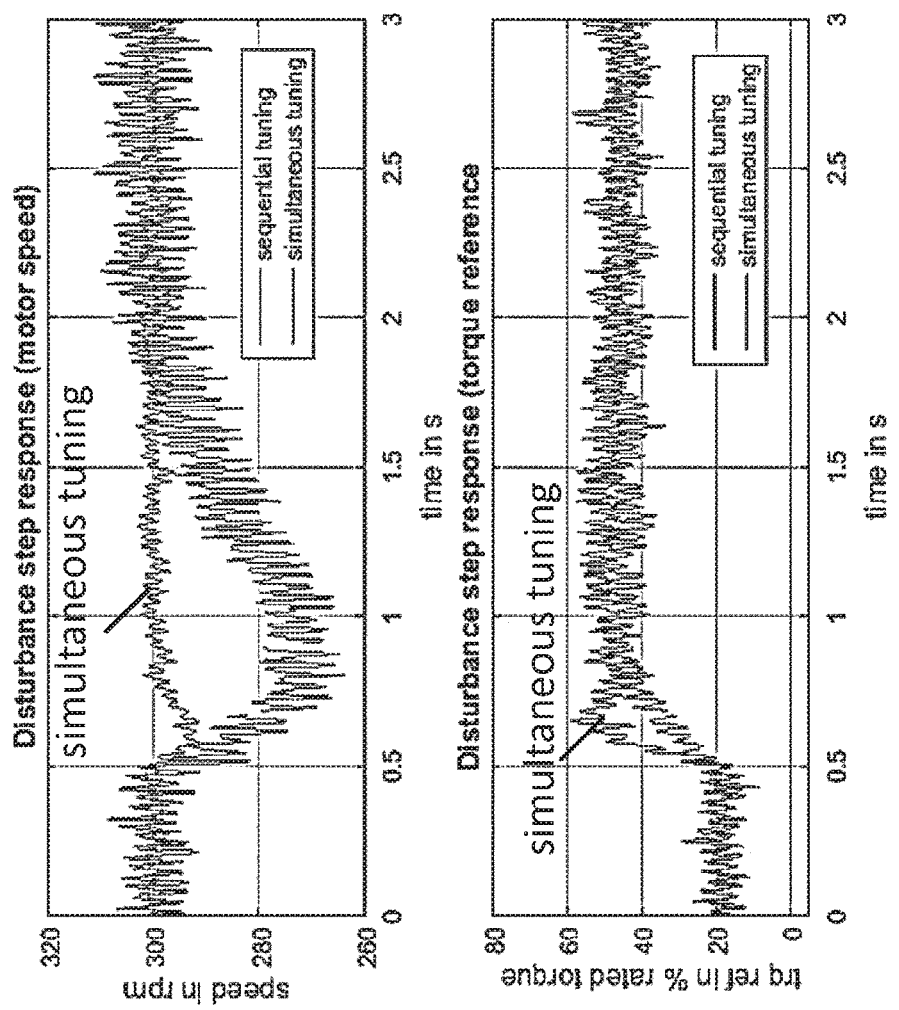
FIG. 5 shows performance improvement achieved by simultaneously tuning controller and feedback filter parameters.
Figure 5B:
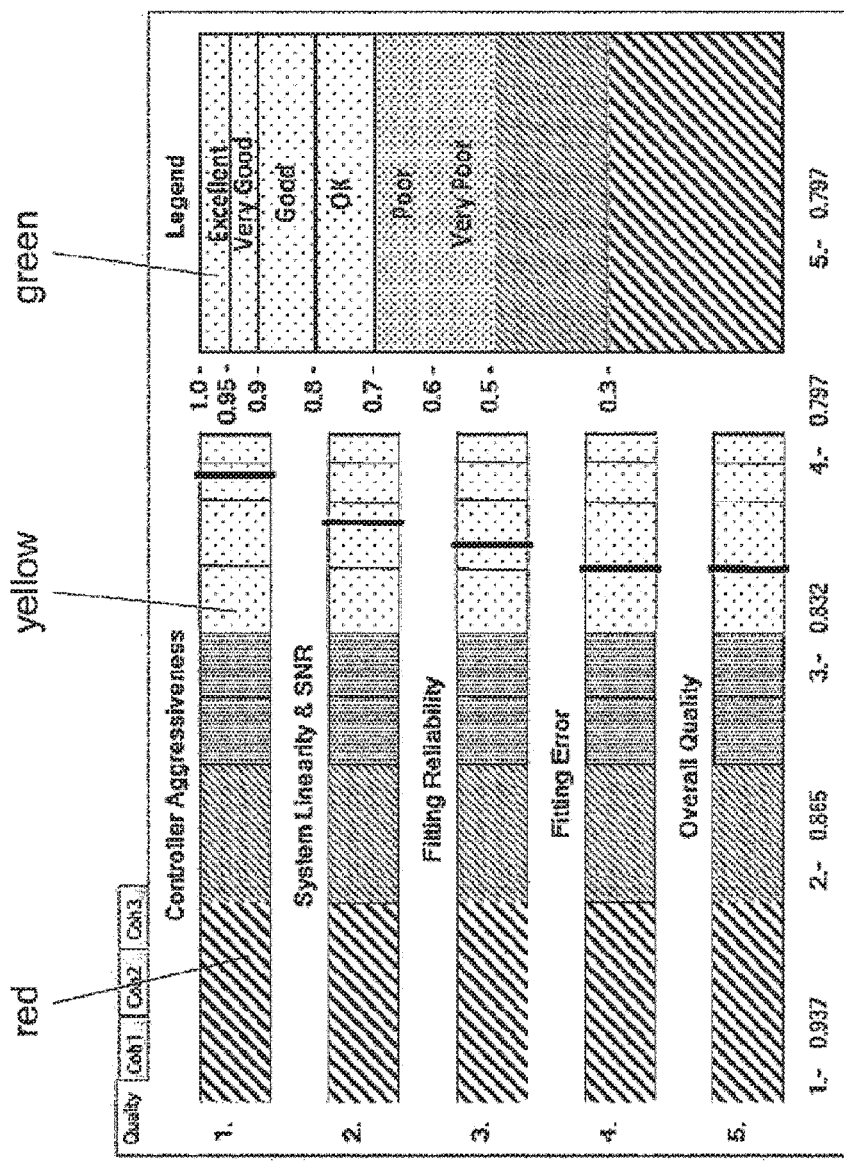
FIG. 5b shows different criteria for quality indication of plant identification.

This indicator is simply calculated by considering the feature with the lowest score (controller aggressiveness, system linearity, fitting reliability fitting error) as depicted in FIG. 5b.

The disclosure also contains the contents of the following papers:

"Combining usability and performance—what smart actuators can learn from automatic commissioning of variable speed drives" (Proceedings Actuator 2016, ISBN 978-3-93333-26-3)

Abstract: The required steps for an automatic commissioning system for variable speed drives are summarized and an overview of existing approaches to the individual steps is provided. Furthermore, new results are presented on automatic design of plant identification experiments and the simultaneous parameterization of all relevant filters in the control loop based on the quality of available measurement signals. This results in a complete toolchain for commissioning speed control loops and allows to get the best possible performance out of the available hardware without requiring expert knowledge. It is discussed which steps will be necessary to establish a similar combination of performance and usability for smart actuators such as e.g. SMA or EAP.

Introduction: Variable speed drives (VSDs) are state-of-the-art in modern automation applications due to their energy efficiency and flexibility. Typical tasks include tracking of speed set-points and maintaining desired speed despite external disturbances. This is why drives are operated under closed-loop feedback as shown in FIG. 1.

Productivity is key in such applications and can directly be related to the tuning of the parameters of the feedback-loop. As a consequence, poorly tuned parameters may have negative effects, ranging from degraded performance to instability and mechanical damage. But tuning requires expert know-how, from both a controls and application perspective. This is the major reason why the majority of VSDs are operated with very defensive default parameters in practice, resulting in poor overall performance of the application.

In order to change this situation and lift the full potential of VSDs in such applications, this paper presents methods for automatic parameterization of the control loops during the commissioning phase. While this in itself is not new, this paper focuses on incorporating two disregarded aspects:

i) In order to develop a truly automatic commissioning system, the experiments for gathering measurement data for plant identification have to be carefully designed. Particularly, identification experiments without operator input are needed.

ii) The quality of the speed signal available for feedback plays a crucial role for the achievable control performance, since any measurement implies the introduction of noise into the control loop as depicted in FIG. 1.

While it is intuitive that a clean signal obtained from a high-quality encoder allows for higher control performance, compared to the noisy speed signal measured by a low-cost device, an automatic commissioning system has to take into account the quality of the speed measurement.

To this end, not only the speed PI controller but also additional filters in the control loop have to be considered simultaneously.

Many of these consequences should be carefully taken into account when designing controllers for systems containing smart actuators as well. Thus, the latter can still learn a lot from classical drives.

The remainder of the paper is organized as follows: In the next Section we will present the basic models used inside drive commissioning and introduce the plant identification experiment performed together with the plant identification itself. After that the fundamentals of the combined controller/filter tuning are explained before we highlight the major learning possibilities for smart actuators. Lastly, a conclusion is provided.

Automatic speed control commissioning in variable speed drives:

As an example for automatic commissioning, we consider the parameterization of the speed control loop of variable speed drives connected to a mechanical load. The control loop with its relevant dynamic elements is sketched in FIG. 1.

We focus on mechanical plants which can be described by two compliantly coupled inertia. The dynamics of the mechanical part can be described by the transfer function $$G_m(s) = \frac{J_L s^2 + d_T s + k_T}{J_M J_L s^3 + d_T J_{tot} s^2 + k_T J_{tot} s}, \quad (1)$$

where $J_M$ is motor side inertia, $J_L$ is load side inertia, $J_{tot}=J_M+J_L$ is the total inertia, and $k_T$ and $d_T$ describe the stiffness and damping of the compliant coupling, respectively. We omit motor and load side damping in this paper for the sake of brevity and clarity of presentation but the presented methods can readily be extended to take such effects into account. While the torque control of modern drives is typically non-linear [1], the closed-loop behaviour of the torque control block can be approximated by simplified linear models for the purpose of speed controller design. Common approximations are second-order lag elements with time delay [3] or first-order lag elements. In this overview, we rely on the latter, i.e.

$$G_{TC}(s) = \frac{1}{T_e s + 1}, \quad (2)$$

where the electrical time constant $T_e$ characterizes the dynamics of the torque control loop and is assumed to be known from torque control performance specifications.

The structure of the speed controller and the speed feedback filter are fixed in standard drives, where most commonly PI controllers and first-order low-pass feedback filters are in use. The corresponding transfer functions are $$G_{PI}(s) = K_P + \frac{K_I}{s}, \quad (3)$$

$$G_f(s) = \frac{1}{T_f s + 1}. \quad (4)$$

The challenge in commissioning is to find suitable parameters $K_P$, $K_I$, and $T_f$ that result in sufficient speed control performance. While "performance" is most commonly perceived as high control bandwidth, smoothness of the control signal (torque reference) is another important tuning objective.

Designing the plant identification experiment:

In a first step, the total mechanical inertia $J_{tot}$ is to be roughly estimated. A common approach is to apply torque ramps and infer total inertia from measured torque $T_M$ and speed $\omega_{act}$. Since torque ramps hardly excite the high-frequency dynamics of the mechanics, compliance of the coupling can be neglected resulting in the simplified transfer function $$\tilde{G}_m(s) = \lim_{k_T \to \infty} G_m(s) = \frac{1}{J_{tot} s}. \quad (5)$$

Thus, $J_{tot}\dot{\omega}_{act} \approx T_M$ and $J_{tot}$ can be estimated e.g. from integrating speed (once) and torque (twice) or by applying recursive least-squares techniques in time domain [3].

For estimating the remaining mechanical parameters, higher frequency ranges have to be excited. As depicted in FIG. 1, an excitation signal is injected on torque reference level. Alternatively, the excitation signal can also be specified on speed level [4]. For identifying mechanical loads in drive systems, e.g. sine sweeps, chirp signals and pseudo-random binary signals (PRBS) can be used (see e.g. [15], [16] for an overview on plant identification signals). Here, we rely on PRBS signals due to their guaranteed amplitude limits and comparatively easy parameterization. With the basic signal type chosen, it remains to parameterize the identification signal. The basic reasoning is that the plant should on the one hand be excited as much as possible to maximize the signal-to-noise ratio in the signals recorded for identification. On the other hand, excitation should be as less as possible in order to minimize the mechanical stress for the plant. While this general idea is intuitive, it typically requires experience to properly choose the signal parameters.

The PRBS signal is characterized by two key properties: The signal amplitude $\alpha_{PRBS}$ and the cycle time $\lambda_{PRBS}$. According to [1], [15], the power spectral density (PSD) of the PRBS signal can be considered to be constant up to a frequency of $$f_{3dB} = \frac{1}{3\lambda_{PRBS}}, \quad (6)$$

with a PSD magnitude of $$S_{dd}(\omega) = \alpha_{PRBS}^2 \lambda_{PRBS}. \quad (7)$$

Analyzing (7), an increased amplitude directly raises the PSD and thus improves signal-to-noise ratio. Furthermore, an increased cycle time results in larger values of the PRBS PSD at low frequencies but limits the frequency range of excitation according to (6), (7). In [1], the influence of PRBS parameters on the resulting identification quality was studied experimentally. Here, we propose to predict the quality of identification results based on PRBS signal properties and the quality of the available speed feedback signal. The identification quality can be quantified by specifying a tolerated variance $\gamma$ in the resulting frequency response, i.e. the non-parametric Bode magnitude plot estimate.

Assuming a constant noise level $\bar{S}_{nn}$ in the measurement signal and exploiting the PSD properties (6), (7) of a PRBS signal, the required amplitude of the PRBS signal to achieve the desired identification quality can be derived as $$a_{PRBS} = \frac{2\pi}{\gamma} J_{tot} f_{3dB}^{\frac{3}{2}} \sqrt{3\bar{S}_{nn}}. \quad (8)$$

Therein, $J_{tot}$ is the total system inertia and $f_{3\,dB}$ is the frequency up to which the plant is to be excited for identification. While it is evident that larger excitation amplitudes are required for systems with higher inertia, analyzing (8) also reveals that identifying dynamics at high frequencies comes at the price of overproportionally large excitation amplitudes.

Depending on the amplitude that can be tolerated by the mechanics attached, the identifiable frequency range is thus limited.

To benefit from (8) in the sense of automatic parameterization of the identification experiment, the noise level in the speed measurement $\bar{S}_{nn}$ has to be known. Ideally, this would be obtained by running the system in torque control mode (i.e. open-loop control with respect to speed) and estimating the PSD $S_{nn}(\omega)$ of the speed signal e.g. by applying the Welch method [15], [16]. However, in practice it is paramount in a lot of applications to maintain a constant speed and the estimation of feedback signal quality has to be conducted in closed-loop. To mitigate this, a very defensive speed PI controller can be employed for the identification experiments. Therewith, the complicating effects of closed-loop identification [15], [16] can be neglected and the PSD of measurement noise can be approximated by the PSD of measured speed after removing signal mean.

Hence, $\bar{S}_{nn}$ can be inferred from averaging $\hat{S}_{yy}(\omega)$, i.e. an estimate of the measured speed PSD after removing signal mean.

Plant Identification:

From the plant identification experiment described in the previous section, the PRBS, torque, and speed signal are available as measurements. In the next step, the objective is to identify the parameters of the mechanical part of the plant. Both time-domain approaches [5], [6] and frequency-domain methods [3], [4], [12], [17] have been reported for solving this task.

For the latter, a first step is to obtain a non-parametric estimate of the frequency response. In case of open-loop identification, a conceptually simple approach is to infer an estimate $\hat{G}_m(j\omega_i)$ by dividing the Discrete Fourier Transform (DFT) of speed by the DFT of torque as e.g. reported in [11]. To mitigate leakage effects and for obtaining smoothed and consistent estimates, the Welch method can be employed to calculate estimates of (cross-) power spectral densities [3], [4]. Denote with $\hat{S}_{yu}(\omega)$ the cross PSD of speed and torque and with $\hat{S}_{uu}(\omega)$ the power spectral density of torque, the frequency response can be estimated by $$\hat{G}_m(j\omega) = \frac{\hat{S}_{yu}(\omega)}{\hat{S}_{uu}(\omega)}. \quad (9)$$

However, (9) implicitly assumes open-loop identification. As discussed before, we study the practically relevant case of closed-loop identification here. In such a situation, it is beneficial to base the frequency response estimation on three signals according to $$\hat{G}_m(j\omega) = \frac{\hat{S}_{dy}(\omega)}{\hat{S}_{du}(\omega)}, \quad (10)$$

where d is the PRBS signal, u is the torque reference and γ is measured speed. This will improve the overall quality of the non-parametric estimates.

Since the structure of the mechanical system at hand is known, it is possible to identify the physical parameters of the mechanics based on the non-parametric estimate of the frequency response. This can be formalized into solving the optimization problem $$\min_{J_M, J_L, k_T, d_T} \sum_{i=1}^{N} \kappa_i |G_{m,i}(j\omega_i) - \hat{G}_{m,i}(j\omega_i)|^2. \quad (11)$$

Therein, $G_{m,i}(j\omega_i)$ is the transfer function of the two-mass model (1) evaluated at the frequency $\omega_i$ and $\hat{G}_{m,i}(j\omega_i)$ is the corresponding non-parametric estimate. The factor $\kappa_i$ can be employed to weight the error terms in the cost function. As pointed out in [3], [4] the problem (11) is non-convex and hence non-trivial to solve. In addition to that, a standard least-squares curve fit may not lead to satisfying results due to two main reasons: Firstly, the non-parametric Bode plot is deteriorated especially at anti-resonance frequencies [3]. To tackle this problem, we propose to employ the coherence function relating the PRBS signal and the speed signal for weighting the errors in (11) similar to the results presented in [14]. Intuitively speaking, the coherence function quantifies to what extent an output can be explained by a given input and a linear system connecting the two [3]. From the estimates of (cross-) spectral densities, the coherence of two signals u and γ can be calculated from $$\gamma^2(\omega) = \frac{|S_{yu}(\omega)|^2}{S_{uu}(\omega)S_{yy}(\omega)}. \quad (12)$$

The proposed coherence weighting $\kappa_i = \gamma^2(\omega_i)$ ensures that frequency ranges in which the non-parametric frequency response estimate is unreliable are less significantly taken into account for the identification of physical parameters in the curve fit.

FIG. 2 shows an example of a coherence function estimate next to the corresponding calculated measured frequency response.

Secondly, unmodeled effects may affect curve fitting results negatively. As an example consider the non-parametric estimate in FIG. 3 (blue). Apparently, more than one resonance is present. One option would be to extend the model structure to three- or multiple-mass systems [3], [4]. This comes at the cost of increased computational load for solving the curve fitting. However, for a lot of applications it is sufficient to only model the first resonance of the system. Consequently, only frequencies up to an upper bound $f_{max}$ are taken into account in the curve fitting process. The frequency $f_{max}$ can easily identified by human inspection of the frequency response estimate. To automatically determine $f_{max}$, peak-detection algorithms [21] can be applied to a smoothed version of the frequency response estimate. Having determined the anti-resonance ($f_a$) and resonance ($f_0$) frequency, the upper bound can be estimated by mirroring $f_a$ with respect to $f_0$ in logarithmic scaling, i.e.

$$f_{max} = \frac{f_0^2}{f_a}. \quad (13)$$

FIG. 3 also shows an example of a curve fit (red) obtained by constraining the frequency range for fitting and employing coherence weighting.

Simultaneous Controller and Filter Tuning:

Assuming a model of the mechanical plant as well as the dynamics of the underlying closed-loop torque control, several results have been reported on tuning the parameters of the PI speed controller. In systems with stiff load coupling, frequently used approaches are the tuning based on the symmetric and amplitude optimum [13], [18], [20]. For mechanical systems with compliant load coupling, tuning rules for PI controllers are provided in [7] and [8]. An optimization-based approach solely relying on non-parametric plant models is presented in [11].

Furthermore, structural controller extensions such as additional feedbacks [9], model-predictive control [10], and Fuzzy-PI [17] have been reported. However, such advanced control structures are often not available in industrial drives and furthermore come with the drawback of increasing tuning complexity. In addition to that, the approaches mentioned above take into account the dynamics of compliant load coupling, but neglect the dynamics of the torque control loop. Even the single additional pole introduced by the simplified first-order approximation (2) can cause a severe loss of phase margin and might even result in instability. We emphasize that it is therefore mandatory to take all relevant dynamic elements in the speed control loop into account as also proposed in [19]. This also involves the speed feedback filter (4), typically being a first-order low-pass.

Traditionally, the speed PI controller is regarded as the key element to achieving good speed control performance. The feedback filter has been receiving a lot less attention, since a common assumption is that the filtering should be as light as possible.

In the following, we show that heavier feedback filtering does in fact not necessarily result in degraded performance. The reason for this is that tuning the speed loop in real-world systems always has to take into account the quality of the available speed measurement. While this statement might seem trivial at first sight, its implications are substantial. If the speed measurement is e.g. heavily corrupted by noise, only very small controller gains can be realized in order not to amplify noise too much. In such a situation, heavier feedback filtering can in fact allow for higher controller gains while keeping the ripple in the torque signal below specified limits.

Since the speed PI controller and the feedback filter are part of the same control loop, it is not advisable to tune them separately. Changing the feedback filter after parameterizing the speed PI controller will deteriorate performance and can even result in instability.

Formalizing the idea introduced above, we propose to simultaneously tune the speed PI and the feedback filter. The general reasoning that is not limited to speed loop tuning is to take all relevant dynamic elements in a control loop into account and to tune all adjustable parameters in a control loop simultaneously.

A frequently used tuning objective is to maximize speed loop performance (i.e. bandwidth). However, several constraints limiting the achievable performance are to be considered. We formulate this idea as an optimization problem and subsequently explain the constraints below.

$$\max_{K_P, K_I, T_f} \min_{i=1,\ldots,6} |\lambda_i|, \text{ subject to} \quad (14)$$

$$\arctan\left(-\frac{\text{Im}(\lambda_i)}{\text{Re}(\lambda_i)}\right) < \alpha, \forall\, i = 1, \ldots, 6,$$

$$\text{Re}(\lambda_i) > \beta, \forall\, i = 1, \ldots, 6,$$

$$\sqrt{\hat{S}_{uu}} < \delta, \hat{S}_{uu}(\omega) = |G_{un}(\omega)|^2 \cdot \overline{S}_{nn}$$

In (14), $\lambda_i$ are the closed-loop poles, i.e. the roots of the denominator in $$G_{cl}(s) = \frac{G_f(s)G_{PI}(s)G_{TC}(s)G_m(s)}{1 + G_f(s)G_{PI}(s)G_{TC}(s)G_m(s)}. \quad (15)$$

As depicted in FIG. 4, the objective is to maximize the minimum absolute values of all closed-loop eigenvalues, which corresponds to the bandwidth of the control loop. The first constraint bounds the angle of closed-loop poles in the complex plane, thereby ensuring stability and preventing excessive oscillations. The second constraint limits the aggressiveness of the controller and thereby prevents excitation of higher order resonances (cf. $f_{max}$ in (13)). Lastly, the tolerated noise level in the control signal, i.e. the commanded torque reference, is bounded. Therein, the torque PSD $\hat{S}_{uu}(\omega)$ is estimated based on the identified noise level in the speed measurement ($\overline{S}_{nn}$) and the transfer function $G_{un}(\omega)$ linking measurement noise to the control signal.

We point out that the benefit of the last constraint in (14) is twofold: Firstly, the torque noise bound $\delta$ provides an intuitive means for trading-off smoothness of the control signal and speed control performance. The larger $\delta$ is chosen, the more torque ripple is tolerated and the higher the achievable performance will be. Secondly, the quality of the available feedback signal is quantified by $\overline{S}_{nn}$ and thus explicitly taken into account for controller and feedback filter tuning.

FIG. 5 shows an exemplary result, comparing the resulting speed control performance of a standard approach (tuning speed PI parameters for a fixed feedback filter time) and the proposed simultaneous tuning of speed PI and feedback filter. Both controllers have been tuned to result in the same noise level in the control signal (cf. lower plot in FIG. 5). The simultaneous tuning approach results in a much larger speed feedback filter time. As a consequence, more aggressive PI gains are possible, resulting in substantially improved control performance at the same level of torque ripple.

What smart Actuators can learn from successful autotuning of variable speed drives:

Modeling the structure of the individual elements in the control loop is a necessary first step in developing automatic commissioning systems. Such models will be of more complex nature in smart actuators compared to the presented VSDs here. Since most often descriptions based on PDEs are employed, model-reduction techniques are needed to define an appropriate model for control design. In a second step, identification experiments have to be designed to provide sufficient excitation allowing for reliable identification. This step is devoted to estimating the parameters of the plant. As we showed, estimating the quality of the available feedback signal is another vital part of plant identification. Once parametric models of the plant are available, the parameters of the feedback loop can be tuned.

It is advisable to employ three signals for obtaining a non-parametric estimate of the frequency response. Furthermore, coherence weighting is an efficient method to improve parametric estimates obtained by fitting a mechanical model onto the estimated frequency response. This can still be a valuable method even if more complex actuator models are investigated. A third important aspect is to constrain the curve fitting to frequency ranges that are valid for the chosen model structure—strongly depending on the model reduction performed. Lastly, we emphasize that the achievable identification quality is naturally limited by the amount of samples available for identification.

Finally, key to achieving a high control-loop performance is to simultaneously tune all parameters in a feedback loop, instead of sequential tuning. Furthermore, the quality of the feedback signal is to be taken into account, since it is one of the main factors determining the achievable performance.

We point out that optimization-based tuning approaches provide an effective way of combining performance and usability if a mapping of intuitive performance criteria to constraints in the optimization problem can be established. Due to ever increasing computational power, the additional computational load, compared to simple tuning rules such as the symmetric optimum rule, is less and less relevant.

Conclusion:

In this paper we showed key ingredients for automatic commissioning of VSDs. Starting from appropriate grey-box models to the parameter identification and finally to the combined tuning of the relevant feedback-loop parameters.

All of the above will also be necessary in smart actuator systems to achieve high closed-loop performance even though the complexity of the models and interdependencies of the different steps will be much higher.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS 1 first control signal
2 mechanical device
3 control circuit
4 return signal
4' second return signal
5 excitation signal
6 second control signal
7 actual angular velocity
8 torque control
9 speed controller
10 velocity filter

What is claimed is:

1. A method to identify physical parameters of a mechanical load with integrated reliability indication, comprising:
   applying a first control signal to a mechanical device in a control circuit;
   measuring a first return signal;
   using a power density spectrum of the first return signal to stipulate an excitation signal for the mechanical device; and
   using a reference model for the mechanical device, the reference model being describable by physical parameters, the physical parameters being selected such that a weighted summed deviation between a frequency response of the reference model and a calculated frequency response is minimized,
   wherein the mechanical device comprises a motor.

2. The method according to claim 1, wherein the excitation signal comprises a pseudo-random binary signal.

3. The method according to claim 1, further comprising:
   applying a second control signal to the control circuit, the second control signal comprising the first control signal and the excitation signal;
   calculating power density spectra of the second control signal and a second return signal; and
   calculating a frequency response of the mechanical device from the power density spectra.

4. The method according to claim 1, wherein the weighting is carried out using a coherence function.

5. The method according to claim 4, further comprising:
   using the coherence function in order to quantify an approximation to the calculated frequency response by the reference model.

6. The method according to claim 5, wherein the coherence function comprises a mean value in a frequency range considered.

7. The method according to claim 1, wherein the excitation signal comprises a broad-band excitation signal.

8. The method according to claim 1, wherein the reference model comprises a two-mass oscillator.

9. A method to identify physical parameters of a mechanical load with integrated reliability indication, comprising:
   applying a first control signal to a mechanical device in a control circuit;
   measuring a first return signal;
   using a power density spectrum of the first return signal to stipulate an excitation signal for the mechanical device;
   applying a second control signal to the control circuit, the second control signal comprising the first control signal and the excitation signal;
   calculating power density spectra of the second control signal and a second return signal; and
   calculating a frequency response of the mechanical device from the power density spectra, so as to identify the physical parameters of the mechanical load.

10. A method to identify physical parameters of a mechanical load with integrated reliability indication, comprising:
    applying a first control signal to a mechanical device in a control circuit;
    measuring a first return signal;
    using a power density spectrum of the first return signal to stipulate an excitation signal for the mechanical device; and
    using a reference model for the mechanical device, the reference model being describable by physical parameters, the physical parameters being selected such that a weighted summed deviation between a frequency response of the reference model and a calculated frequency response is minimized.

11. The method according to claim 10, wherein the weighting is carried out using a coherence function.

12. The method according to claim 11, further comprising:
    using the coherence function in order to quantify an approximation to the calculated frequency response by the reference model.

13. The method according to claim 12, wherein the coherence function comprises a mean value in a frequency range considered.

14. The method according to claim 10, wherein the reference model comprises a two-mass oscillator.

15. A method to identify physical parameters of a mechanical load with integrated reliability indication, comprising:
    applying a first control signal to a mechanical device in a control circuit;
    measuring a first return signal;
    using a power density spectrum of the first return signal to stipulate an excitation signal for the mechanical device;
    applying a second control signal to the control circuit, the second control signal comprising the first control signal and the excitation signal;
    calculating power density spectra of the second control signal and a second return signal; and
    calculating a frequency response of the mechanical device from the power density spectra, so as to identify the physical parameters of the mechanical load,
    wherein the mechanical device comprises a motor.

* * * * *